April 21, 1964  E. A. JOHNSON  3,129,454
HIDE PULLER
Filed March 20, 1963  2 Sheets-Sheet 1
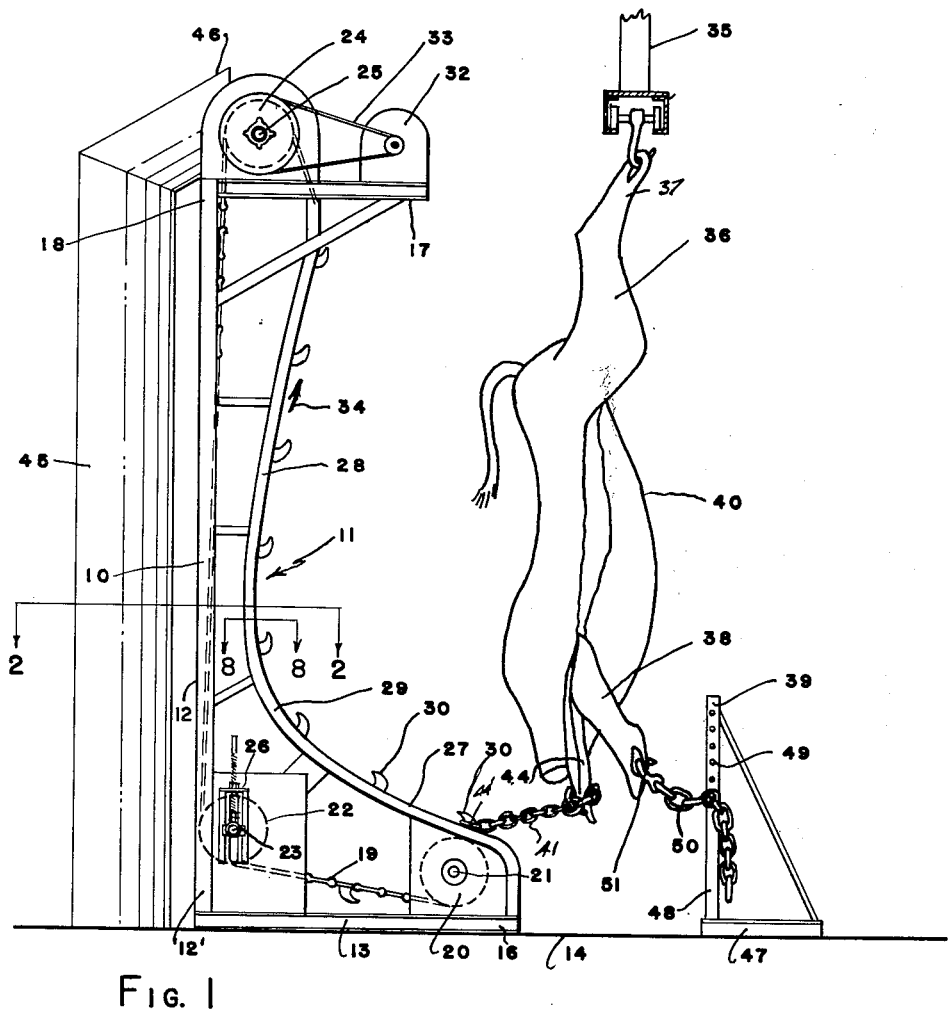
Fig. 1
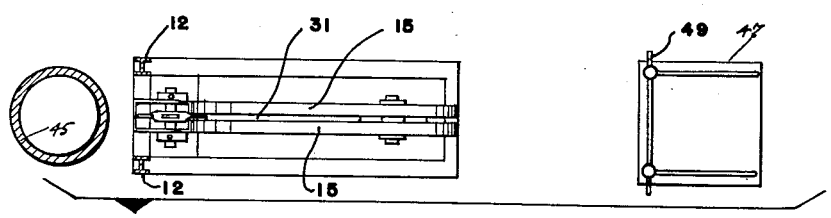
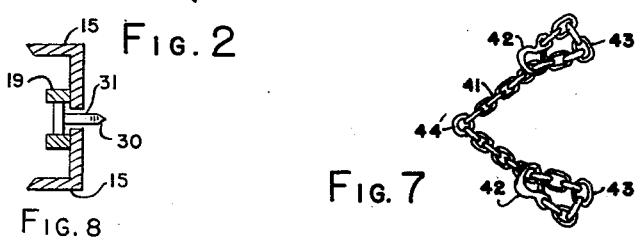
Fig. 2
Fig. 8
Fig. 7
INVENTOR
EDWARD ARVID JOHNSON
HIS ATTYS April 21, 1964

E. A. JOHNSON 3,129,454

HIDE PULLER

Filed March 20, 1963

INVENTOR:
EDWARD ARVID JOHNSON

United States Patent Office 3,129,454
Patented Apr. 21, 1964

3,129,454
HIDE PULLER
Edward Arvid Johnson, Transcona, Manitoba, Canada, assignor to Johnson Bros. Mfg. Ltd., Manitoba, Canada
Filed Mar. 20, 1963, Ser. No. 266,598
12 Claims. (Cl. 17—21)

My invention relates to new and useful improvements in hide pullers, particularly hide pullers adapted to strip the hide from beef cattle after said hide has been rimmed back from the underside thereof and disengaged from the front and rear legs of the cattle.

In the processing of beef cattle upon the rail, it is desirable to have a mechanical device to assist in the removal of the hide from the cattle, and relatively expensive devices do exist for such purposes.

These devices normally require the hide to be rimmed back from the underside thereof and disengaged from the front and rear legs. The pair of gripping mechanisms then engage the edges of the hide approximately half way along the flanks thereof and these gripping members are moved rearwardly by compressed air thus rimming back the hide to adjacent the spine. This is often assisted by means of a shoe engaging the backbone of the animal thus permitting the hide to be stripped almost to the spine. However, it then has to be removed by hand and stripped from the tail of the animal, normally including at least two more operations.

My invention overcomes these disadvantages by providing a vertically situated conveyor before which the animal is suspended by the rear legs thereof. After the hide has been rimmed back from the underside thereof and removed from around the front and rear legs, the hide is secured by means of the foreleg portions thereof to hooks extending from the conveyor chain which then moves first rearwardly and then upwardly and forwardly thus stripping the hide completely from the animal including the tail whereupon the hide is deposited in a hide chute all in one operation.

The principal essence and object of my invention is therefore to provide a device of the character herewithin described which facilitates the removal of the hide from beef cattle by stripping the hide completely from the carcass including removing the hide from the tail.

Another object of my invention is to provide a device of the character herewithin described in which the conveyor may be operated continuously and the hides secured to the nearest adjacent moving hook as it passes by the stripping station.

Another object of my invention is to provide a device of the character herewithin described which is easily adjusted for different sizes of cattle.

A further object of my invention is to provide a device of the character herewithin described in which, in one embodiment beef cattle travelling on the rail, can be engaged by the forelegs thereof, to the mechanism and stored, while waiting the positioning of the particular carcass immediately adjacent the hide puller.

A still further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device.

FIGURE 2 is a section along the line 2—2 of FIGURE 1.

FIGURE 7 is a top plan view of the hide holding chain.

FIGURE 8 is an enlarged sectional view of the conveyor guides and chain taken along the line 8—8 of FIGURE 1.

In the drawings like characters of reference indicate corresponding parts in the different figures.

Figure 3:
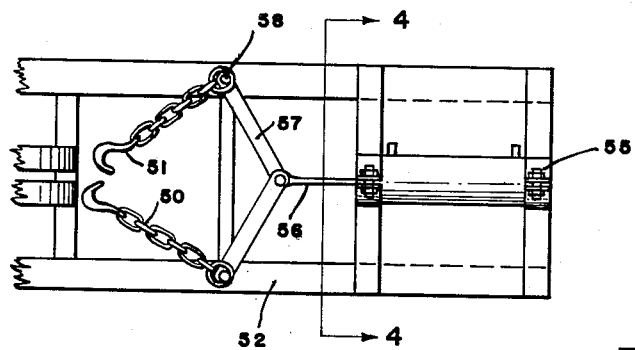
FIGURE 3 is a top plan view of one embodiment of the animal holding device.

Proceeding therefore to describe my invention in detail, reference should be made to the accompanying drawings in which 10 illustrates generally the vertical supporting framework of the device carrying the conveyor collectively designated 11. The framework consists of a pair of spaced and parallel upright members 12 and a pair of spaced and parallel base members 13 by which the device is anchored to the floor 14. A pair of spaced and parallel conveyor guides 15 extend from the outer ends 16 of the base members 13 to upper transverse members 17 extending from the upper ends 18 of the vertical members 12.

These members 15 are of flanged design and are in spaced and parallel relationship as clearly shown in FIG. 2 and form guides for the conveyor 11.

This conveyor comprises an endless chain 19 extending around the bottom sprocket 20 carried upon shaft 21 within the framework, around an adjustable chain tensioning sprocket 22 carried upon shaft 23 adjacent the lower ends 12' of the vertical members and around an upper drive sprocket 24 carried upon shaft 25 journalled for rotation upon the upper end of the framework within brackets (not illustrated).

The chain tighteners 26 in conjunction with sprocket 22 are conventional in construction and therefore will not be described in this specification.

The flanged portions 15 of the framework include upwardly and rearwardly extending, slightly concavely curved lower front portions 27 and upwardly and forwardly inclining and extending upper front portion 28 with a transitional curved portion 29 joining the two portions 27 and 28, the contour of which is clearly shown in FIGURE 1 and of importance is the fact that the portion 28 does not extend vertically but inclines forwardly and upwardly as clearly illustrated.

A plurality of hooks 30 are secured to the chain 19 at intervals therealong and these hooks are adapted to extend between the flanged members 15 through the space 31 therebetween as clearly shown in the drawings.

A source of power taking the form of an electric motor 32 is mounted upon the upper transverse members 17 and a belt 33 is operatively connected between the motor and the upper sprocket 24 to supply power to the conveyor thus driving it in the direction of arrow 34.

The entire device is situated adjacent a conveyor rail 35 upon which beef cattle 36 may be suspended by the hind legs 37 thereof in the usual manner.

When it is desired to strip the hide from the carcass, the front legs 38 are anchored to means collectively designated 39 whereupon the hide is rimmed back from the underside 40 of the animal thereof and cleared from the front and rear legs 38 and 37.

A length of chain 41 as shown in FIGURE 7 is utilized to secure the hide to the conveyor for pulling purposes and this chain includes a pair of rings 42 upon each end thereof through which the chain is passed to form loops 43 within the ends.

The detached leg portions 44 of the hide are each passed through one of the loops 43 which are then pulled tight in the form of a slip chain thus anchoring the hide securely and the chain 41 is engaged by the center link 44' thereof upon the hook 30 just starting the upper run of the conveyor.

The hide is therefore pulled upwardly and away from the carcass as the specific hook moves upwardly thus assisting in removing the hide from over the shoulder portion of the carcass. The forwardly and upwardly inclined portion 28 of the conveyor assists in the detachment of the hide from the carcass along the spine and around the hind quarters area.

As the specific hook carrying the chain 41 passes over the top pulley 24, the hide is completely stripped from the carcass and from the tail and is automatically dumped into a hide chute 45, the entrance 46 of which is situated adjacent the upper pulley 24, it being understood that the hook 30 is now in the down turned position thus permitting the hide to become disengaged, the chain 41 being recovered, as desired, for reuse.

The hide chute 45 may, of course, convey the hides to any convenient location desired.

Various means 39 are provided to anchor the front legs 38 of the carcass during the pulling operation and FIGURES 1 and 2 show one such device. This consists of a stand including base members 47 and a pair of spaced and parallel upright members 48 each of which is provided with pins 49 extending from one side thereof.

Lengths of chain 50 having hooks 51 upon each end thereof are engaged by one of the links thereof over any one of the pins 49 and the hooks 51 are engaged within the hock bones of the front legs thus anchoring the carcass firmly in position during the pulling operation.

Figure 4:
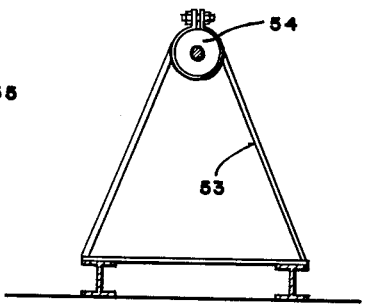
FIGURE 4 is a view along the line 4—4 of FIGURE 3.

FIGURES 3 and 4 show an alternative method in which the stand includes a pair of spaced and parallel base members 52 and triangular support members 53 extending from the base members 52. These triangular supports 53 carry a fluid operated piston and cylinder assembly 54 therein by means of clamps 55, the piston rod 56 of the assembly 54 being connected to outwardly diverging arms 57. The chain and hook assemblies 50 and 51 hereinbefore described are connected to pins 58 extending upwardly from the extremities of the arms 57 thus operating in a manner similar to the stand hereinbefore described.

Figure 5:
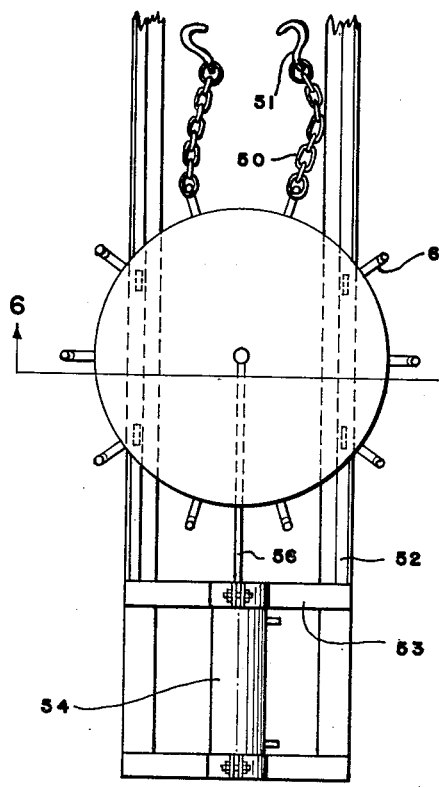
FIGURE 5 is a top plan view of an improved version of the animal holding device.
Figure 6:
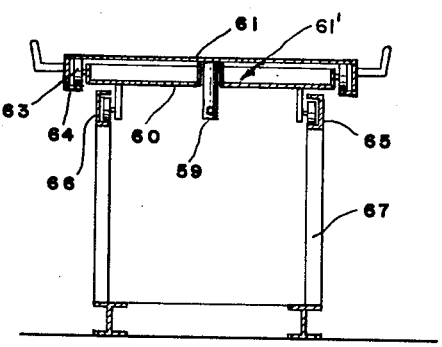
FIGURE 6 is a section along the line 6—6 of FIGURE 5.

FIGURES 5 and 6 show a further stand particularly suited for use with a conveyor system of processing beef carcasses.

This also includes base members 52 and triangular members 53 carrying a piston and cylinder assembly 54 as hereinbefore described. However, in this particular embodiment the piston rod 56 engages a spindle 59 journalled for rotation within a base plate 60, said spindle having a turntable 61 secured to the upper end thereof and rotatable therewith. This turntable is provided with a plurality of hooked pins 62 upon the perimeter thereof, upon which chain and hook assemblies 50 and 51 may be engaged as desired.

The fluid operated cylinder and piston assembly in both of the embodiments shown in FIGURES 3 and 4 and in FIGURES 5 and 6 permits horizontal adjustment of the device with the particular carcass being stripped thus allowing the device to be used with beef carcasses of different sizes and weights.

The turntable 61 shown in FIGURES 5 and 6 permits carcasses to be engaged upon the hook pins 62 and moved into position in front of the hide stripping assembly when same is clear.

To facilitate the rotation of the turntable 61 upon the base 60, a plurality of rollers 63 engageable within the flanged edge 64 of the turntable may be provided upon the base 60. Also in order to facilitate the horizontal movement of the entire turntable assembly 61', same may be mounted by means of wheels 65 carried within horizontally spaced and parallel channels 66 supported upon the upper ends of vertical members 67.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A hide puller for stripping hides from cattle and the like that are suspended from the hind legs thereof from an overhead conveyor rail; comprising in combination a substantially vertically extending, supporting framework, a conveyor mounted in said framework, said conveyor including an endless conveyor chain and means mounting said conveyor chain for movement within said framework, said conveyor chain including an upwardly moving front run and a downwardly moving return run, conveyor front run guide means forming part of said framework, said guide means cooperating with said front run to control the directional characteristics of said front run, said conveyor guide means including an upwardly and rearwardly extending lower portion, a forwardly and upwardly inclined upper portion, and a concavo-convexly curved transitional portion connecting said upwardly and rearwardly extending portion to said forwardly and upwardly extending portion, and means on said conveyor chain selectively connectable with the hide of said cattle adjacent the front legs of said cattle, whereby, after said hide has been rimmed back and detached from the legs of the cattle, said hide is stripped off said cattle as said means moves upwardly with the front run of said conveyor chain, means to selectively anchor the front legs of said cattle and a source of power for said conveyor.

2. The device according to claim 1 in which means to selectively anchor the front legs of the cattle comprises a stand, said stand including a pair of spaced and parallel upright members, a plurality of pins extending from each of said members, and chains selectively engageable by one link thereof to any one of said pins and by one end thereof to the front leg of the cattle.

3. The device according to claim 1 in which said means to selectively anchor the front legs of the cattle includes a stand, a fluid operated piston and cylinder assembly mounted horizontally in said stand, and means operatively connecting said piston and cylinder assembly selectively to the front legs of the cattle.

4. The device according to claim 3 in which said means to selectively connect said front legs of the cattle to said piston and cylinder assembly, includes a turntable mounted for horizontal rotation upon said stand, a plurality of pins extending from the perimeter of said turntable and chains selectively engageable by one link thereof to any one of said pins and by one end thereof to the front leg of said cattle.

5. The device according to claim 1 in which said means on said conveyor chain comprises a plurality of hooks secured to said conveyor chain and spaced at intervals therealong.

6. The device according to claim 5 in which said means to selectively anchor the front legs of the cattle includes a stand, a fluid operated piston and cylinder assembly mounted horizontally in said stand, and means operatively connecting said piston and cylinder assembly selectively to the front legs of the cattle.

7. The device according to claim 5 in which means to selectively anchor the front legs of the cattle comprises a stand, said stand including a pair of spaced and parallel upright members, a plurality of pins extending from each of said members, and chains selectively engageable by one link thereof to any one of said pins and by one end thereof to the front leg of the cattle.

8. The device according to claim 7 in which said means to selectively anchor said front legs of the cattle includes a turntable mounted for horizontal rotation upon said stand, a plurality of pegs extending from the perimeter of said turntable and chains selectively engageable by one link thereof to any one of said pins and by one end thereof to the front leg of said cattle.

9. The device according to claim 5 in which all of said portions of said conveyor front run guide means include a pair of spaced and parallel flanged members, said hooks extending between said flanged members, said conveyor chain bearing against the underside of said flanged members and being guided thereby.

10. The device according to claim 9 in which said means to selectively anchor the front legs of the cattle includes a stand, a fluid operated piston and cylinder assembly mounted horizontally in said stand, and means operatively connecting said piston and cylinder assembly selectively to the front legs of the cattle.

11. The device according to claim 9 in which means to selectively anchor the front legs of the cattle comprises a stand, said stand including a pair of spaced and parallel upright members, a plurality of pins extending from each of said members, and chains selectively engageable by one link thereof to any one of said pins and by one end thereof to the front leg of the cattle.

12. The device according to claim 11 in which said means to selectively anchor said front legs of the cattle includes a turntable mounted for horizontal rotation upon said stand, a plurality of pegs extending from the perimeter of said turntable and chains selectively engageable by one link thereof to any one of said pins and by one end thereof to the front leg of said cattle.

References Cited in the file of this patent

UNITED STATES PATENTS 2,545,718    Weber _____ Mar. 20, 1951